US011012962B2

(12) United States Patent
Hans et al.

(10) Patent No.: US 11,012,962 B2
(45) Date of Patent: May 18, 2021

(54) TRANSMISSION TIME INTERVAL CONTROL (71) Applicant: IPCom GmbH & Co. KG, Pullach (DE)

(72) Inventors: Martin Hans, Bad Salzdetfurth (DE); Andreas Schmidt, Braunschweig (DE); Maik Bienas, Schoeppenstedt (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

(21) Appl. No.: 16/081,549

(22) PCT Filed: Mar. 8, 2017

(86) PCT No.: PCT/EP2017/055427
§ 371 (c)(1),
(2) Date: Aug. 31, 2018

(87) PCT Pub. No.: WO2017/153464
PCT Pub. Date: Sep. 14, 2017

(65) Prior Publication Data
US 2019/0075536 A1 Mar. 7, 2019

(30) Foreign Application Priority Data

Mar. 8, 2016 (EP) .................................... 16159194

(51) Int. Cl.
*H04W 56/00* (2009.01)
*H04B 17/364* (2015.01)
(Continued)

(52) U.S. Cl.
CPC ...... *H04W 56/0045* (2013.01); *H04B 17/364* (2015.01); *H04L 25/03006* (2013.01); *H04W 72/0446* (2013.01); *H04W 72/087* (2013.01)

(58) Field of Classification Search
CPC ......... H04W 56/0045; H04W 72/0446; H04W 72/087; H04B 17/364; H04L 25/03006
See application file for complete search history.

(56) References Cited

U.S. PATENT DOCUMENTS

2007/0201404 A1* 8/2007 Cheon ..................... H04L 47/29
370/331
2009/0034474 A1* 2/2009 Yavuz ................... H04L 1/0007
370/331
(Continued)

FOREIGN PATENT DOCUMENTS

WO   WO-2016152676 A1   9/2016
WO   WO-2017051712 A1   3/2017

OTHER PUBLICATIONS

Larry J. Greenstein et al.: "A New Path-Gain/Delay-Spread Propation Model for Digital Cellular Channels", IEEE Transactions on Vehicular Technology, IEEE Service Center, Piscataway, NJ, US, vol. 46, No. 2., May 1, 1997. XP011063572, issn: 0018-9545, p. 478.

(Continued)

*Primary Examiner* — Candal Elpenord
*Assistant Examiner* — Xuan Lu
(74) *Attorney, Agent, or Firm* — Marshall, Gerstein & Borun LLP (57) ABSTRACT The present invention provides a method of determining a transmission time interval length to be used for communications between a user equipment device and a base station in response to a new service request, wherein the transmission time interval length is selected dependent on a timing advance value to be used by the user equipment device for communication with the base station.

10 Claims, 7 Drawing Sheets (51) Int. Cl.
*H04L 25/03* (2006.01)
*H04W 72/04* (2009.01)
*H04W 72/08* (2009.01)

(56) References Cited

U.S. PATENT DOCUMENTS

| | | | |
|---|---|---|---|
| 2009/0186613 A1* | 7/2009 | Ahn | H04W 72/042 |
| | | | 455/434 |
| 2012/0039182 A1 | 2/2012 | Zhou et al. | |
| 2015/0016431 A1* | 1/2015 | Ranta-Aho | H04W 72/0406 |
| | | | 370/336 |
| 2016/0128095 A1* | 5/2016 | Damnjanovic | H04L 1/1812 |
| | | | 370/336 |
| 2016/0269150 A1* | 9/2016 | Jiang | H04L 1/1861 |
| 2017/0150373 A1* | 5/2017 | Brennan | H04W 16/28 |
| 2017/0238301 A1* | 8/2017 | Nakazawa | H04W 72/04 |
| | | | 370/329 |
| 2019/0021024 A1* | 1/2019 | Yoshizawa | H04L 1/1887 |
| 2019/0223204 A1* | 7/2019 | Kim | H04L 5/0055 |

OTHER PUBLICATIONS

International Search Report for International Application No. PCT/EP2017/055427, dated May 23, 2017.

* cited by examiner

TRANSMISSION TIME INTERVAL CONTROL

CROSS-REFERENCE TO RELATED APPLICATIONS

This is the United States national phase of International Patent Application No. PCT/EP2017/055427, filed Mar. 8, 2017, which claims the priority benefit of European Application No. 16159194.6, filed Mar. 8, 2016. The entire contents of each of the foregoing are incorporated herein by reference.

FIELD OF THE DISCLOSURE

The present invention relates to controlling a length of a transmission time interval in a mobile communication system.

BACKGROUND

In cellular mobile communication systems typically the uplink (UL) and downlink (DL) of mobile devices (user equipment, UEs) are time aligned. The timing alignment refers to transmission and reception at the base station, BS. That is, signals that are considered to be transmitted in the same slot in downlink direction are transmitted simultaneously by the base station; whereas signals that are transmitted in the same slot in uplink direction are transmitted by the UEs with an individual timing advance that results in simultaneous reception at the base station.

The timing advance (TA) is setup and maintained between UE and base station (BS) through timing measurements in the BS and explicit signalling to the UE in the Medium Access Control protocol (MAC). This is described, for example, in a mobile communications standards document 3GPP TS 25.321.

At initial access, i.e. when there is no relative timing information available in the UE or BS, the UE performs an initial random access procedure by transmitting a RACH preamble exactly at a downlink frame boundary. The BS measures the offset between the downlink sub frame border and the sub frame border of the received signal, calculates the TA value and sends the TA value back to the UE to adjust the timing for any further transmission.

In consecutive UL transmission events the base station may measure the timing again and adjust the TA if necessary. Details of how the 6-bit timing advance command is used to either advance or delay a UE's uplink transmission timing can be found in section 4.2.3 of 3GPP TS 36.213. Whenever a TA information is received the UE starts a timer and once the timer expires the UE considers the timing to be un-aligned and starts with the random access procedure for next transmission.

A transmission time interval (TTI) is an interval of time for transmission of one layer 2 data unit (PDU). The TTI comprises the group of blocks of resources for the transmission to which the same coding and modulation is applied. It is also the shortest period over which a bit error rate (BER) can be estimated. Consequently, in wireless communication systems with link adaptation techniques it is generally beneficial to have a short TTI in order to be able to quickly adapt to the changing conditions of the radio link.

In LTE the TTI length is fixed to 1 ms. In UMTS and HSPA it is 2 ms, 10 ms (or 20 ms, 40 ms, 80 ms for some channels), and fixed for a given channel.

For a next generation (5G) radio interface, a much shorter and flexible TTI length is envisaged together with a coexistence of different TTI length values for different users or different channels within the same frequency band (or, within the same time/frequency resource lattice). Figures of ⅕ to ​1/10 of the LTE TTI length, i.e. 0.1 ms to 0.2 ms TTI can be expected.

As all the data bits within one TTI are coded and transmitted together, any forwarding of data has to wait for decoding of all the bits. Further, any feedback mechanism that relies on the decoding result (successful/not successful), e.g. for error correction mechanisms like HARQ, will have to wait for the decoding. Thus, for reducing transmission latency in the data path a shorter TTI is beneficial to allow faster feedback and forwarding of data.

On the other hand, there are drawbacks with shortening the TTI. With a shorter TTI the symbol length will also be reduced (to fit the symbols in the TTI). However, in order to overcome inter-symbol interference, especially in OFDM-based systems like LTE, a cyclic prefix (or postfix, CP) is needed. The length of the CP depends on the maximum expected delay spread of multi-path links, i.e. the CP cannot easily be reduced with a reduced TTI.

Another drawback with shortening the TTI is basically constant amount of control information that is transmitted within every TTI, e.g. to schedule DL-TTI resources (indicate to whom the TTI belongs), schedule the UL and provide other necessary control information. The amount of control information is mostly on a per-TTI basis and not per-bit so that the same amount of control overhead has to be carried within the TTI.

Thus, reducing the TTI length while keeping the CP length and amount of control information reduces the data per TTI but keeps the order of overhead unchanged, i.e. the ratio of useful data to overhead is reduced. This ratio is a key parameter for efficient transmission systems and thus it cannot be ignored.

US 2014/0321440 A1 describes a mobile cellular communication system that defines at least two different TTI length for transmission of data. A dynamic selection is described where individual dynamic selection is performed for a plurality of mobile devices within a cell, i.e. different mobile device can have different TTI settings.

Examples are gives in which the TTI can be shorter, where transmission conditions are good (e.g., a UE is close to a BS, there is little interference), and longer, where transmission conditions are poor (e.g., a UE is located at the NodeB cell edge, there is substantial interference).

Nothing in US 2014/0321440 describes a TTI selection based on an actual distance between UE and BS, e.g. measured by the timing advance. Even when mentioning different TTIs to be selected for near-BS UEs and UEs at the cell edge, this is only a description of different receive characteristics (or in the language of the document. a different link budget), but not an actual distance given by a propagation delay and measured using the timing alignment procedure and its outcome.

US 2014/0185441 A1 describes a system for changing the TTI length (e.g. from 2 ms to 10 ms or vice versa) based on resource occupation to achieve balance between the quality of service (QoS) of the user and the cell capacity. Only the load and available resources are taken into account, neither the distance between UE and BS nor the timing advance value are mentioned to be used.

U.S. Pat. No. 7,515,579 describes a system to dynamically select one of two TTI, e.g. 2 ms and 10 ms. The communications system is configured such that the mobile device uses the 2 ms TTI during periods of time in which a higher quality radio channel environment exists and the 10 ms TTI during periods of time in which a lower quality radio channel condition exists.

US 2015/0016431 A1 describes a method for determining a TTI length in which a UE transmits a request for a particular TTI, with the request being processed in the base station. US 2012/0039182 describes varying a TTI length according to a cyclic prefix configuration with cyclic prefix configuration information being transmitted by a UE. Document R1-160937 from 3GPP Meeting TSG RAN WG1 #84 describes TTI shortening to reduce latency. E. Lähetkangas et al. in IEEE ICC '14 in a paper entitled "Achieving low latency and energy consumption by 5G TDD mode optimization" describe scheduling latency in a 5G mobile communications system and the use of a shorter cyclic prefix and guard period leading to shorter frames.

GENERAL DESCRIPTION

The present invention provides a method of determining a transmission time interval length to be used for communications between a user equipment device and a base station in response to a new service request, wherein the transmission time interval length is selected dependent on a timing advance value to be used by the user equipment device for communication with the base station.

Preferred aspects of the method of the invention are provided according to the dependent method claims.

The invention provides a corresponding radio access network node and a core network entity arranged to implement the method of the invention. In a still further aspect, the invention provides a user equipment device adapted to determine a transmission time interval length using a timing advance parameter received from a base station.

By means of the present invention a sensible selection of TTI length values in a system that allows multiple different TTI length values to be applied simultaneously (e.g., within the same time/frequency resource lattice) is possible.

As stated above, a shorter TTI significantly reduces latency of the data path, which is desirable for certain services like gaming, interactive conversation etc. As the efficiency of the physical layer configuration decreases with shorter TTI especially when the multipath delay spread (and thus the CP length) and control overhead stays the same or increases, shorter TTIs should only be used if efficiency can be kept over a minimum desirable value. Shorter TTIs must not be used if system efficiency worsens (e.g., falls below a certain threshold). A longer TTI introduces more delay into the transmission path but increases efficiency for higher delay spreads.

The present invention allows a selection of a TTI value appropriately, taking into account the expected delay spread and service requirements for the respective user and channel.

The selection is done firstly based on the distance between UE and BS. As known from, for example, a paper by Larry J. Greenstein et al, "A new path-gain/delay-spread propagation model for digital cellular channels", IEEE Trans Vehicular Technology Vol. 46, 2, May 1997, pp 477-485, the delay spread and distance are related to each other such that the distance can be used as a measure for the expected multipath delay spread and thus provides the required CP length. In order to keep the efficiency of the system above a desirable value, the estimated CP length results in a minimum TTI length that should be configured.

A measure for the distance between the UE and the BS is the TA value that is controlled by the BS by means of measuring the timing of received UL signals as described in the background section. Thus, the TA value can be used to define the minimum possible TTI length.

The TTI length actually used is then chosen between the estimated minimum possible and the maximum defined based on the quality of service requirements and the required efficiency, i.e. the maximum acceptable CP- and control-overhead.

Further to the distance, the geographical or geological environment of the base station and the UE may be taken into account to estimate the expected maximum delay spread. That is, in environments that have very limited multipath propagation like sea area near the coastline a longer distance between UE and BS may accept a shorter CP and thus a shorter TTI. In mountain environments the multipath propagation may be extremely likely and result in high delay spread, thus requiring longer CP and TTI.

Thus, a further aspect of this invention is an estimation of the environment for derivation of possible TTI length values. While environments like sea or mountain area are fixed and understood by the network operator from the location of the BS, there may be other environments that require UE positioning information to be taken into account. The BS may estimate the UE position or it may receive positioning information from the UE. The positioning information may include a height over ground, so that airplane based UEs can be treated differently from ground-based UEs.

A further aspect of the invention is the changing of the selected TTI in case any or multiple of the parameters used for selection of the TTI changes significantly. With the switch of the TTI length the system become highly dynamic and adaptive to mobility of the user that leads to a change in distance between UE and BS or environmental characteristics of the area.

BRIEF DESCRIPTION OF THE DRAWINGS

Preferred embodiments of the invention will now be described, by way of example only, with reference to the accompanying drawings in which.

DETAILED DESCRIPTION

Figure 1:
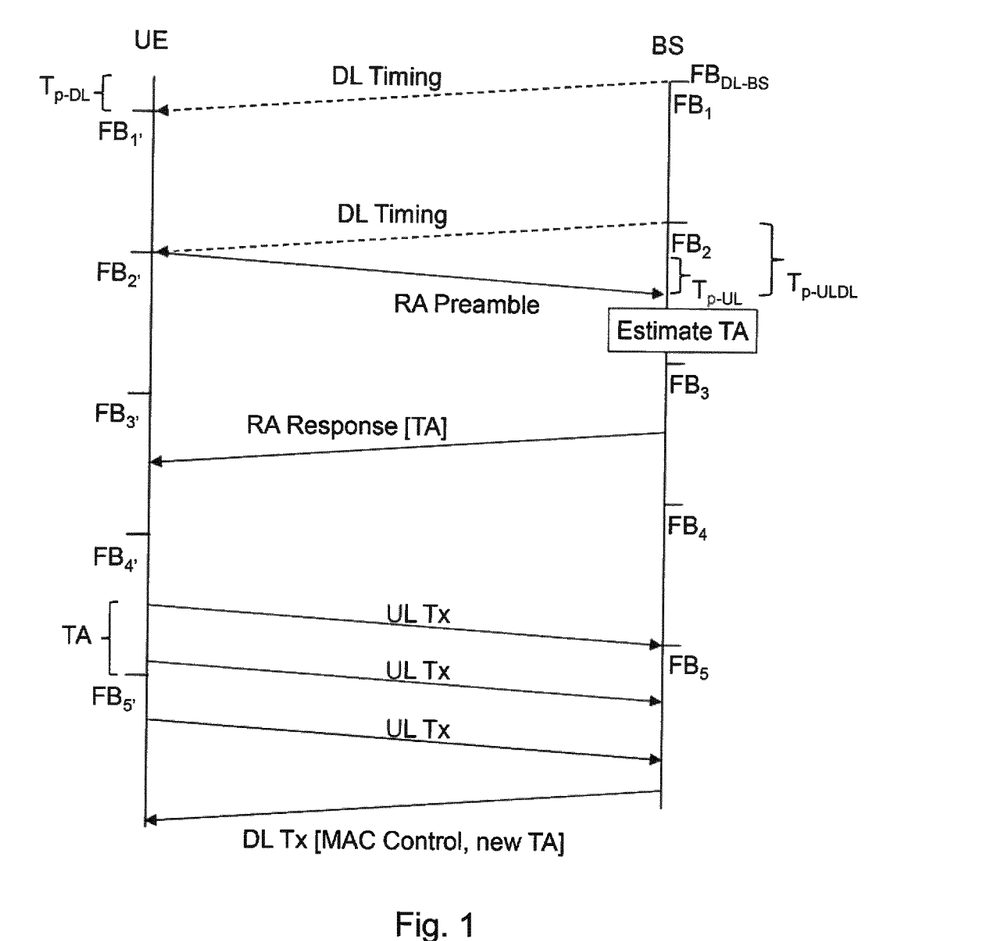
FIG. 1 shows a prior art message sequence.

A prior art initial time alignment procedure between a base station and a UE is shown in FIG. 1. A random access (RA) preamble is sent by a UE to the base station, BS.

The time of transmission at the UE is exactly a frame boundary (FB) that has been derived from DL signals sent earlier by the BS. The FB as estimated at the UE, e.g. $FB_1$ in FIG. 1, is delayed with respect to the respective boundary at the BS by the DL propagation delay $T_{p\text{-}DL}$ resulting from the separation between the UE and the BS. Further frame boundaries, e.g. $FB_2$, $FB_3$, . . . are defined by reception of further downlink signals or using UE internal timing.

The random access preamble transmission time is thus delayed and the reception of the RA preamble suffers the same or a similar propagation delay $T_{p\text{-}UL}$ before received at the BS. Thus, the base station receives the RA preamble delayed by $T_{p\text{-}ULDL}$ with respect to the FB$_2$ in FIG. 1.

The BS estimates a timing advance(TA) value from $T_{p\text{-}ULDL}$ and potentially other influencing parameters and transmits a RA response that contains, besides other information elements necessary for the initial access process, the TA value.

The UE adapts the timing of all of its further UL transmissions as indicated by the TA value so that any UL signals from the UE are received by the BS exactly with the expected timing.

The TA is a measure of the propagation delay $T_{p\text{-}UL}$ in the UL (which is identical to the propagation delay in the DL $T_{p\text{-}DL}$). Thus, the TA is as well a measure of the distance between UE and BS.

Further UL signals from the UE carrying e.g. control information or user data can be analysed for their timing by the base station and further adaption of the TA through MAC signalling is possible.

Figure 2:
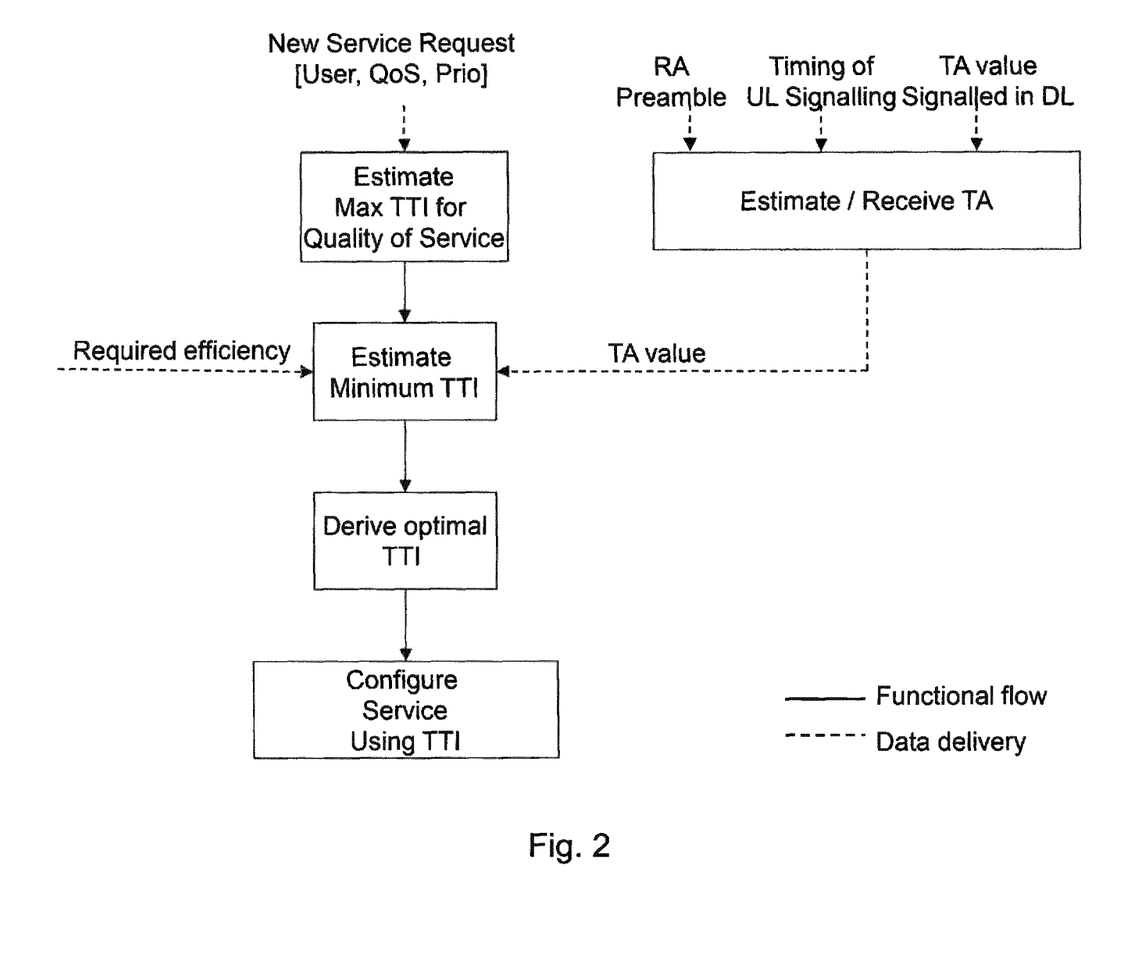
FIG. 2 shows a flow chart of a first embodiment of the invention.

FIG. 2 shows a simplified procedure flow about a configuration of a new service according to the invention.

A new service may be required in a UE for data transfer. Associated with the new service may be a user, a quality of the specific service (QoS) expected by the user of the service and/or a priority. Three different types of services are considered as examples in the following:

Service 1: a data bearer for conversational video with a high data rate and maximum one-way delay over the radio of only 10 ms or 20 ms.

Service 2: a bearer used for a gaming application with low delay requirement around 2 ms one-way at maximum.

Service 3: a video streaming service that is tolerant of delay (100 ms).

A maximum TTI may be estimated from the QoS requested for the service that is able to reliably support the required delay constraints. Accordingly, the QoS requested may optionally be taken into account when determining a suitable TTI.

For the examples above, service 1 may best use a 0.5 ms TTI, while service 2 requires 0.1 ms TTI and service 3 may accept all TTI length values.

At any point before or after the new service request appears, a timing advance (TA) value has been derived, e.g. as described above as part of an initial random access procedure or during further data exchange between the UE and the BS. The TA value may also be received, e.g. as part of the MAC signalling from BS to UE. Note that only one of the options is needed to derive the TA in the "Estimate/Receive TA" block in FIG. 2.

The TA value is now used to estimate a minimum TTI that is needed to keep the transmission efficiency above a certain configurable threshold. The efficiency resulting from different TTIs and control overhead options may be calculated taking the CP length necessary for the expected multipath propagation into account. The efficiency calculation may then use a ratio between time needed for transmission of overhead information and remaining time within a TTI of certain length for transmission of useful data. The required efficiency may be a configurable value that is input to the calculation as shown in FIG. 2.

Next, the two TTI values, i.e. the minimum TTI needed to serve a minimum efficiency or serve at all in a given distance between UE and BS and the maximum TTI that is needed to serve the QoS demand of the service, are brought together.

If there are one or more TTI values available matching both criteria, then these TTI values serve as candidates from which one TTI may be selected. Preferably, the efficiency should be maximized and thus the maximum TTI is chosen from the intersecting set of TTIs.

If no TTIs exist matching both criteria, a compromise has to be found or the service request is rejected. TTI offering slightly compromised efficiency while serving or slightly missing the delay constraints may be acceptable.

After an appropriate TTI is found, the service is configured with resources that are configured using the TTI resulting from the process above.

Figure 3:
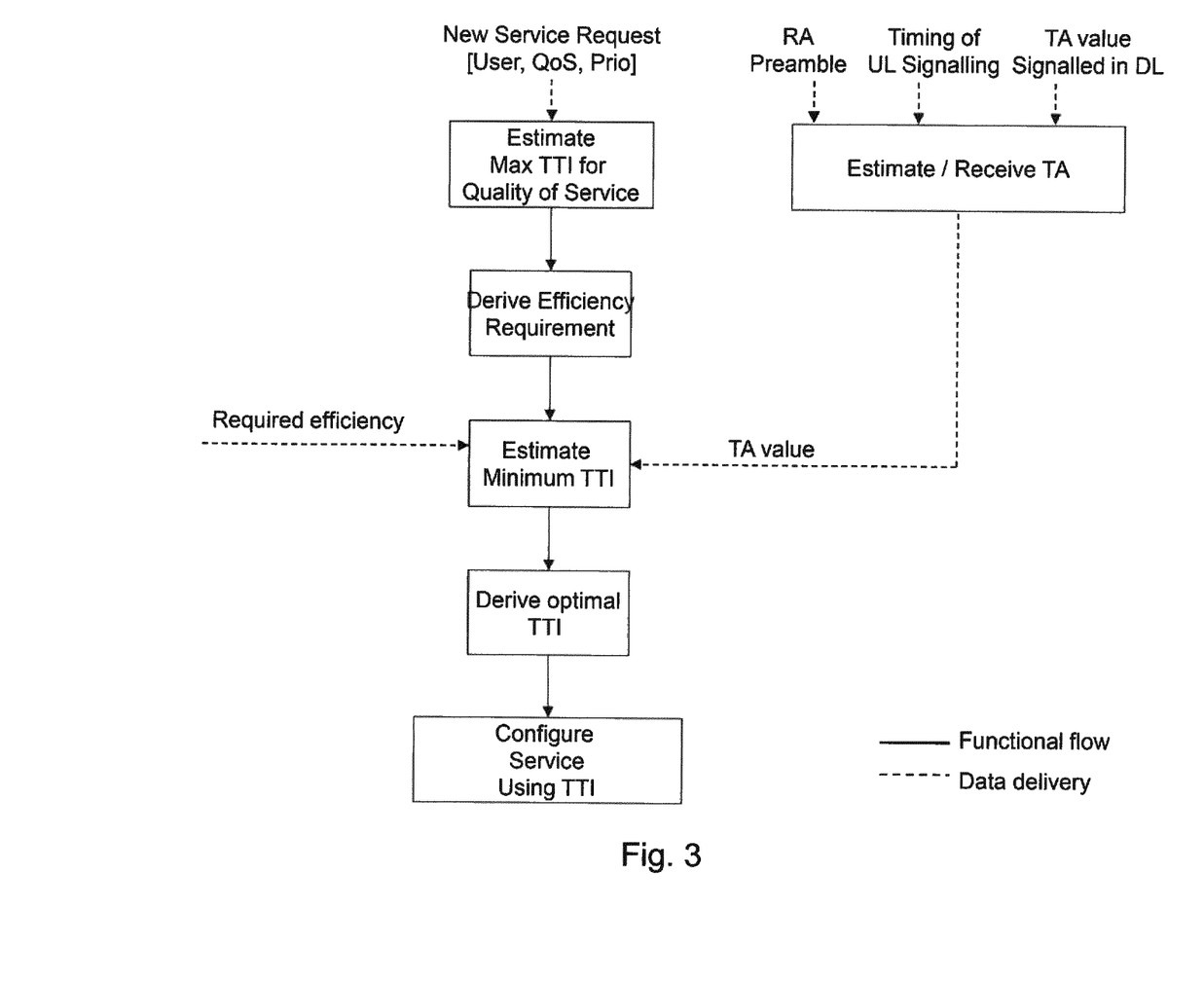
FIG. 3 shows a flow chart of a second embodiment of the invention.

A similar alternative process is shown in FIG. 3. The required efficiency may not be a configured system parameter but it may be derived from the nature of the requested service. In other words, some service may have a higher priority for their latency requirements to be served so that a lower than normal transmission efficiency is acceptable for these service. Other services may have a lower priority so that requested latency requirements are only served if transmission efficiency does not suffer.

FIG. 3 shows a derivation step for system efficiency that may take into account the nature of the service but also the requestor of the service (user, subscriber, man or machine, . . . ). The requestor itself may also define a priority for the request that may influence the derivation, assuming a fair service request by the requestor.

Figure 4:
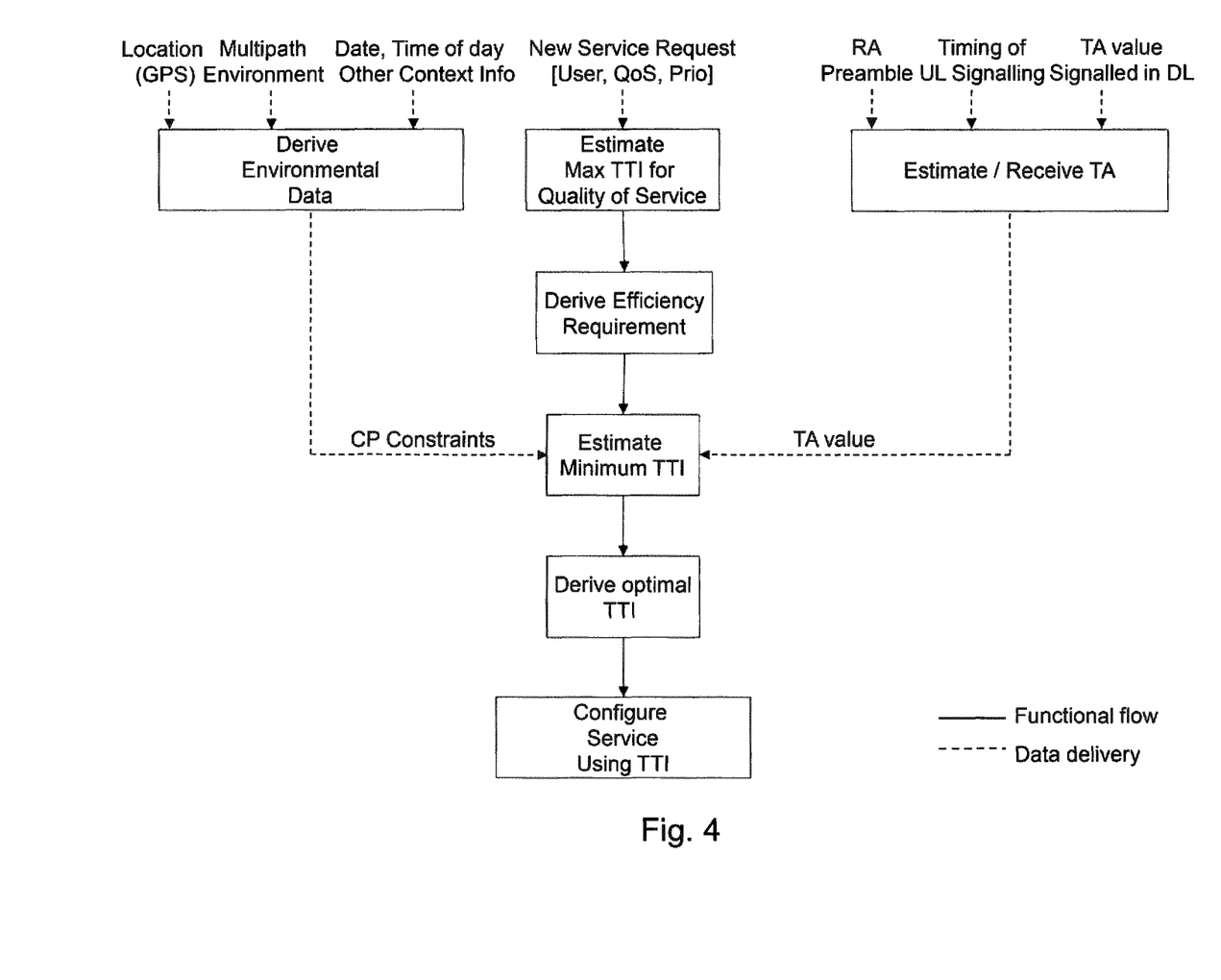
FIG. 4 shows a flow chart of a third embodiment of the invention

Yet another alternative is shown in FIG. 4. Environmental data may be taken into account to estimate the minimum TTI. The environmental data may allow derivation of expected multipath delay spread and thus required CP length for inter-symbol interference free data reception. The CP length will then be taken into account when calculating TTI constraints.

The environmental data may be derived from various input parameters that are received from various sources of information.

One example parameter is a location of the base station (which may be fixed or moving) and/or a location of the UE. Together with geographical knowledge like topology or height of the UE or the BS the location may give knowledge about the expected multipath delay spread and thus influence CP length and TTI length selection.

Also, the multipath environment may be estimated by measurements. The base station can measure multipath delay spread from connections to other UEs or other links to the same UE. Network entities like other BSs could report measurements to the BS to allow for estimation of the delay spread.

Other context information, e.g. time, date or environmental situations like weather, traffic volume etc. may be taken into account.

Any of the alternatives presented herein and depicted in FIGS. 2 to 4 may be used in any combinations of the techniques presented.

The presented methods and the steps therein are depicted in FIG. 2 to be performed in a radio access network (RAN) node, such as a BS, or in a core network (CN) entity. But this is only one example as the procedures are not restricted as to in which entity they are performed. In fact, the methods can be performed in the BS or in the UE or in a cooperative way between UE and BS.

Figure 5:
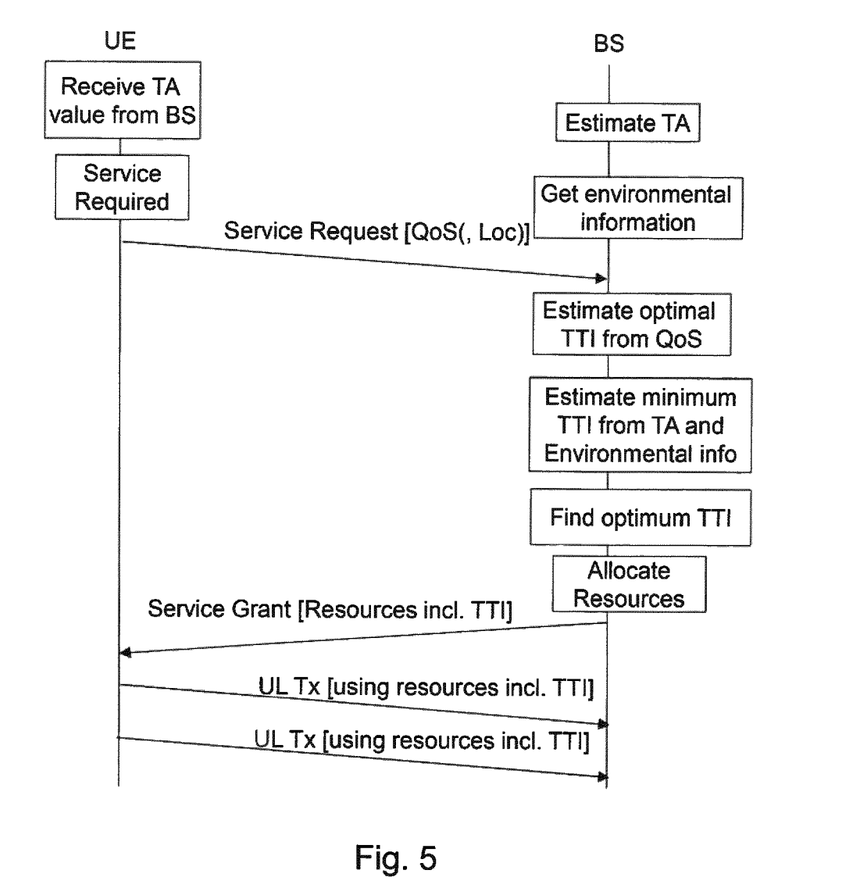
FIG. 5 shows a message sequence chart using the invention.

FIG. 5 depicts the method with the main estimation and calculation steps done in the BS. The UE sends a service request indicating the requested QoS and the BS uses the available information to derive an optimum TTI that is then basis of the resources in the service grant back to the UE.

The service request from the UE to the BS may contain a UE location information (such as latitude, longitude, altitude and accuracy) that can help the BS decide on the required CP length and thus the possible TTI lengths.

Figure 6:
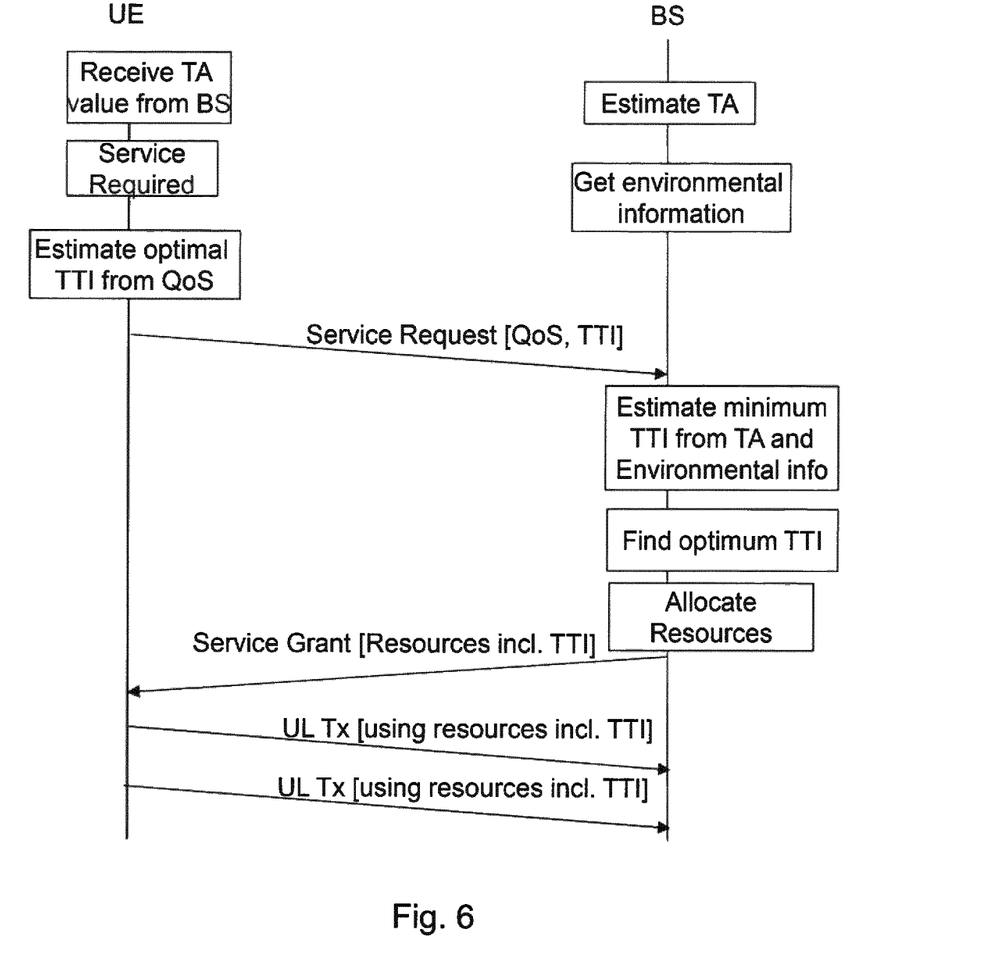
FIG. 6 shows an alternative message sequence chart.

FIG. 6 shows a similar method with the TTI derivation from the requested QoS in the UE. Now the service request will contain a requested TTI and the BS grants a TTI after matching the request with the options left after taking the Timing Alignment and CP constraints from environmental information into account.

According to the method disclosed herein, the eNB (or another node) is enabled to determine different TTI length values to be applied simultaneously in the wireless communication system. That means different resources within the time/frequency resource lattice can be assigned with different TTI lengths (e.g., depending on various criteria, as discussed above).

Figure 7:
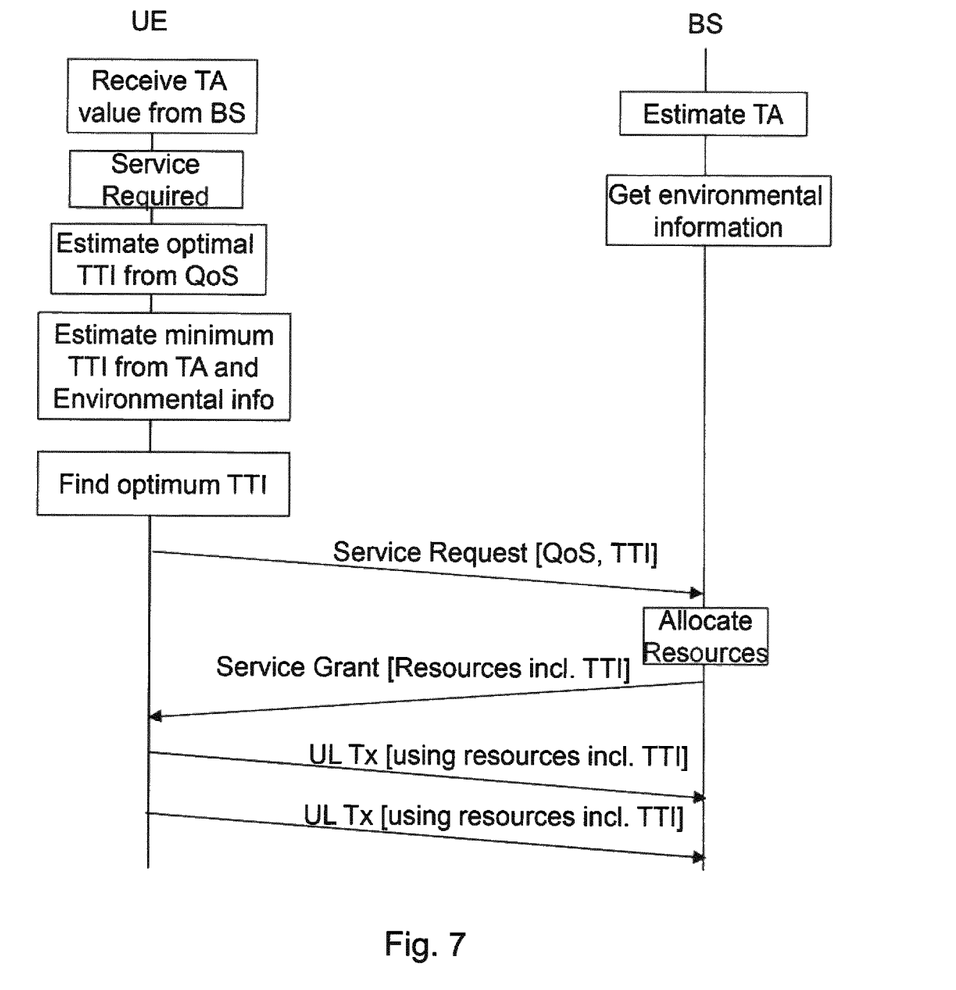
FIG. 7 shows a further alternative message sequence chart.

FIG. 7 shows the method with the main steps done in the UE. A final TTI is requested with the service and the BS finally grants resources based on the UE's TTI decision if respective resources are free.

While the invention has been described in connection with determining a transmission time interval, the use of the timing advance parameter may also be used for determining a suitable length for the cyclic prefix or cyclic postfix. Accordingly, it is a disclosure of the present invention in which the feature of the transmission time interval is replaced by the feature of a cyclic prefix or postfix. The invention therefore further provides a method of determining a cyclic post- or prefix length to be used for communications between a user equipment device and a base station in response to a new service request, post- or prefix length is selected dependent on a timing advance value to be used by the user equipment device for communication with the base station. The following independent and dependent claims would be applicable mutatis mutandis.

The invention claimed is:

1. A method of determining a transmission time interval length to be used for communications between a user equipment device and a base station in response to a new service request, the transmission time interval being an interval of time for a transmission of a data unit, comprising:
   selecting the transmission time interval length dependent on whether the user equipment device is airplane-based and additionally on (i) a timing advance value to be used by the user equipment device for communication with the base station and (ii) positioning information indicating a height of the user equipment device above ground level, and further using the positioning information to obtain an estimation of geographical environment data of the user equipment device, and using the geographical environment data in the selection of the transmission time interval length.

2. The method of claim 1, wherein selecting the transmission time interval length is additionally dependent on a type of communication to be performed.

3. The method of claim 1, further comprising:
   determining a maximum transmission time interval length using a quality of service metric, the selected transmission time interval length having a length less than the maximum transmission time interval length.

4. The method according to claim 1, further comprising:
   determining a minimum transmission time interval length required to maintain a transmission efficiency above a threshold, the selected transmission time interval length being greater than the minimum transmission time interval length.

5. The method according to claim 4, wherein the threshold is a predetermined threshold.

6. The method according to claim 4, further comprising:
   determining the threshold using the new service request.

7. A radio access network node arranged to implement the method according to claim 1.

8. A core network entity arranged to implement the method according to claim 1.

9. A method of determining a transmission time interval length to be used for communications between a user equipment device and a base station in response to a new service request, the transmission time interval being an interval of time for a transmission of a data unit, comprising:
   selecting the transmission time interval length dependent on whether the user equipment device is airplane-based and on positioning information indicating a height of the user equipment device above ground level, and further using the positioning information to obtain an estimation of geographical environment data of the user equipment device, and using the geographical environment data in the selection of the transmission time interval length.

10. A method of determining a transmission time interval length to be used for communications between a user equipment device and a base station in response to a new service request, the transmission time interval being an interval of time for a transmission of a data unit, comprising:
    selecting the transmission time interval length dependent on a determination as to whether the user equipment device is airplane-based, the transmission time interval length selected for an airplane-based user equipment device being different from a transmission time interval length selected for a ground-based user equipment device, and further using positioning information to obtain an estimation of geographical environment data of the user equipment device, and using the geographical environment data in the selection of the transmission time interval length.

* * * * *